United States Patent
Ellington

(10) Patent No.: US 7,512,971 B2
(45) Date of Patent: Mar. 31, 2009

(54) METHOD AND SYSTEM FOR ENABLING REMOTE ACCESS TO A COMPUTER SYSTEM

(75) Inventor: Jeremy Mark Ellington, Austin, TX (US)

(73) Assignee: Newisys, Inc., Austin, TX (US)

( * ) Notice: Subject to any disclaimer, the term of this patent is extended or adjusted under 35 U.S.C. 154(b) by 863 days.

(21) Appl. No.: 10/767,400

(22) Filed: Jan. 29, 2004

(65) Prior Publication Data

US 2005/0204143 A1     Sep. 15, 2005

(51) Int. Cl.
| | |
|---|---|
| G06F 7/04 | (2006.01) |
| G06F 7/58 | (2006.01) |
| G06F 15/16 | (2006.01) |
| G06F 17/30 | (2006.01) |
| G06K 9/00 | (2006.01) |
| G06K 19/00 | (2006.01) |
| G06F 12/14 | (2006.01) |
| G06F 12/00 | (2006.01) |
| G06F 13/00 | (2006.01) |
| H04L 9/32 | (2006.01) |
| G11C 7/00 | (2006.01) |

(52) U.S. Cl. .............................. 726/6; 726/16; 726/17; 726/18; 726/19; 726/20; 726/21; 713/164; 713/183; 713/184; 709/225

(58) Field of Classification Search ................ 726/6, 726/16–21
See application file for complete search history.

(56) References Cited

U.S. PATENT DOCUMENTS

| | | | | |
|---|---|---|---|---|
| 5,239,648 | A  * | 8/1993 | Nukui | 707/10 |
| 6,539,482 | B1 * | 3/2003 | Blanco et al. | 726/7 |
| 7,152,108 | B1 * | 12/2006 | Khan et al. | 709/225 |
| 2002/0095571 | A1 * | 7/2002 | Bradee | 713/164 |
| 2003/0233571 | A1 * | 12/2003 | Kraus et al. | 713/200 |
| 2005/0044411 | A1 * | 2/2005 | Somin et al. | 713/201 |
| 2005/0080897 | A1 * | 4/2005 | Braun et al. | 709/225 |

* cited by examiner

*Primary Examiner*—Ayaz Sheikh
*Assistant Examiner*—Shin-Hon Chen
(74) *Attorney, Agent, or Firm*—Raymond M. Galasso; Galasso & Associates, L.P.

(57) ABSTRACT

Method and systems configured for allowing a non-local remote user to access a computer system with a particular authorization level. Such access is facilitated by examining non-local directory services group memberships of the user and performing a mapping of the user's identity to a corresponding universal local user account that have the proper authorization level or levels. Such methods and systems allow any number of non-local remote users access to the computer system in such a way that the remote user assumes the identity of (i.e., is mapped to) a corresponding universal local user account of an appropriate privilege level. All non-local remote users that the computer system determines to be of the same privilege level will share the identity of the same universal local user account.

28 Claims, 2 Drawing Sheets

METHOD AND SYSTEM FOR ENABLING REMOTE ACCESS TO A COMPUTER SYSTEM

FIELD OF THE DISCLOSURE

The disclosures made herein relate generally to computer systems and, more particularly, to methods and systems configured for enabling remote access to a computer system.

BACKGROUND

For any number of reasons, a computer user (i.e., a user) who does not have a local account on a particular computer system sometimes has a valid need to remotely gain access to that particular computer system. One conventional approach for granting access is assigning a non-local remote user with valid user identification or group identification (UID or GID) by extending the directory service's schema to contain the additional required information. MKSADExtPlugin, which is accessible at www.css-solutions.ca/ad4unix/, is an example of a software package capable of extending the directory service's schema for Microsoft's Active Directory Server.

Such conventional approaches for enabling such access by a non-local remote user have one or more shortcomings associated therewith. For example, system administrators often find extending a directory service's schema to contain additional required information for enabling a non-local remote user to be assigned a valid UID or GED to be an unacceptable solution, as it requires the use of third-party software running on their enterprise computer systems. Other shortcomings associated with such conventional approaches include making access by such non-local users difficult and/or complicated to achieve, compromising security of the computer system, contributing to user and group account clashes, and/or allowing non-local users to pollute the computer systems environment with superfluous directories, processes and files.

Therefore, methods and system configured for enabling remote access to a computer system by non-local users in a manner that overcomes shortcomings associated with conventional approaches for enabling such remote access by non-local users would be advantageous and useful.

DETAILED DESCRIPTION OF THE DRAWINGS

Figure 1:
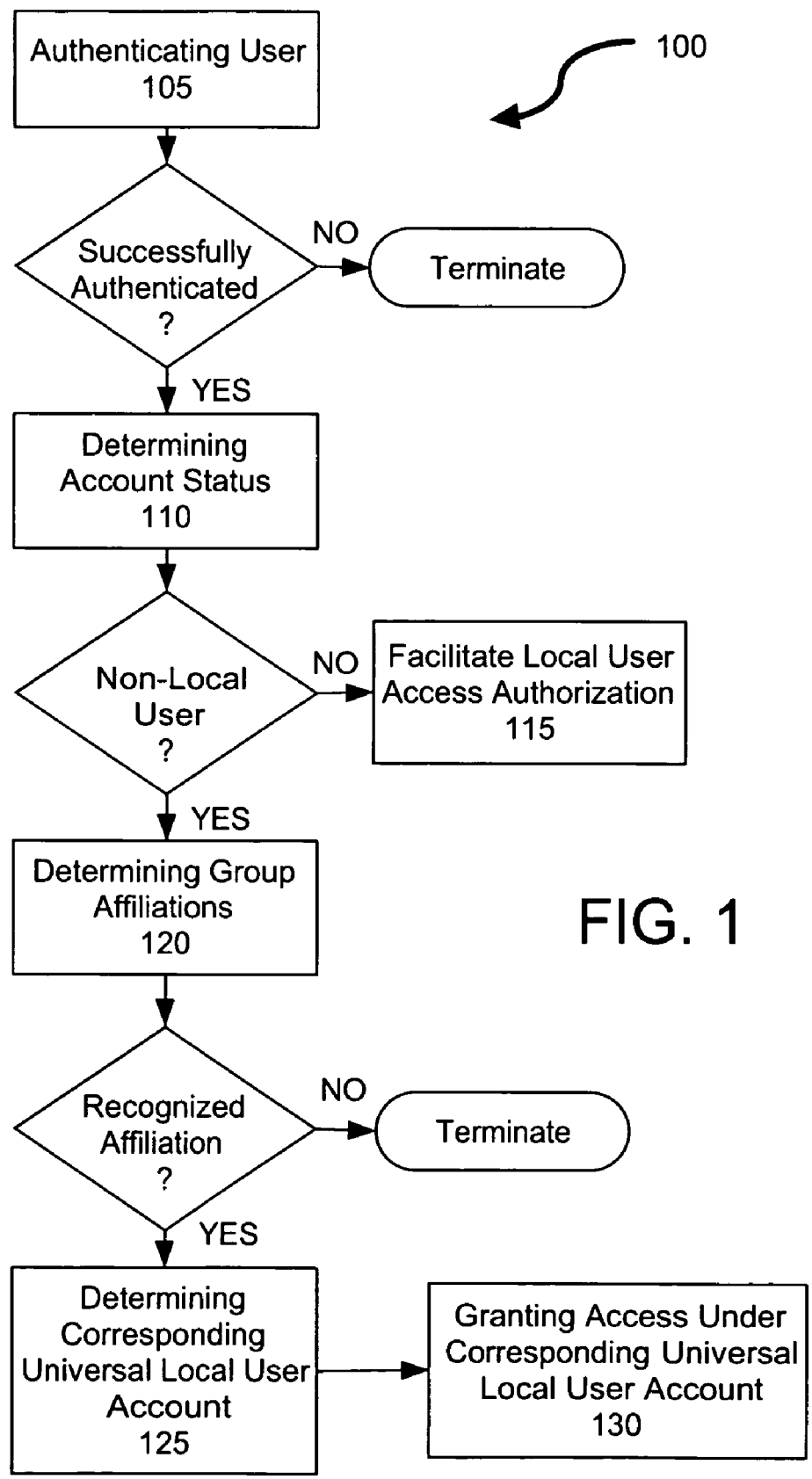
FIG. 1 depicts a method for facilitating remote computer system access in accordance with an embodiment of the disclosures made herein.

Methods and systems configured in accordance with embodiments of the disclosures made herein enable remote access to a computer system by non-local users (i.e., users that do not have a local account). Such methods and systems are referred to herein as disclosed methods and disclosed systems. Disclosed methods and disclosed systems perform remote access functionality in a manner that overcomes shortcomings associated with conventional methods and systems for providing remote access functionality.

A networked computer system including instructions for carrying out a disclosed method is an example of a system in accordance with an embodiment of the disclosures made herein. Remote users without a local user account are referred to hereinafter as non-local remote users.

Disclosed methods and disclosed systems accomplish several objectives. One objective is to allow access to a computer system by a non-local remote user. Another objective is to facilitate the management of non-local remote users' access to a computer system by making the authorization process a simple matter of consulting a remote user's affiliation with specific remote membership groups. Still another objective is to allow non-local remote users to access a computer system without polluting the system's environment with superfluous home directories or processes and files owned by foreign user accounts. Yet another objective is to preclude the directory services administrator from having to extend the directory services schema or run any third party software.

Disclosed methods and disclosed systems are advantageous and unique in that they accomplish such objectives in a manner that overcomes shortcomings associated with conventional methods and systems for providing remote access functionality. Access to one or more computer systems by non-local remote users is managed centrally by managing users' membership in directory services groups. The directory services mechanism is not required to support authorization concepts used on the local computer system (e.g., UIDs or GIDs). Disclosed methods and disclosed systems allow remote users to access a computer system and to be granted an appropriate authorization level without requiring any local configuration for the user. Thus, remote users are granted access in a manner that virtually eliminates the possibility of a remote user's UID or GID clashing with a local user's UID or GID. Thus, disclosed methods and systems prevent irremovable files from being generated and stored. Furthermore, privilege escalation based on a UID or GID clash is virtually eliminated, while still providing non-local remote users access to a respective home directory with the appropriate permissions once they are logged into the computer system.

Disclosed methods and systems allow a non-local remote user to access a computer system with a particular authorization level by examining the user's membership in one or more non-local, directory services groups, and performing a mapping of the user's identity to a pre-existing local account with the proper authorization level(s). Such disclosed methods and systems allows any number of non-local remote users access to the computer system in such a way that the remote user assumes the identity of (i.e., is mapped to) a pre-created local user (i.e., a universal local user account) of an appropriate privilege level. The computer system chooses the appropriate pre-created local user to which the non-local remote user will be mapped by evaluating the non-local remote user's directory services group memberships. All non-local remote users that the computer system determines to be of the same privilege level will share the identity of the same pre-created local user.

In accordance with one embodiment of the disclosed methods and systems, a computer-implemented method for enabling non-local remote users to access a computer system comprises creating a plurality of universal local user accounts, determining a non-local status of a non-local remote user with respect to the computer system, authorizing access to the computer system in response to determining the non-local status, selecting a universal local user account of the computer system dependent upon user account selection information of the non-local remote user and mapping the non-local remote user to the universal local user account (i.e., the corresponding universal local user account). Authorizing access includes verifying that the non-local remote user has an active account on a shared directory service manager. The corresponding universal local user account is one of the plurality of universal local user accounts and each one of the universal local user accounts has a respective access privilege level associated therewith. Several non-local remote users can be simultaneously mapped to the corresponding universal local user account for enabling simultaneous access by each one of the non-local remote users to the computer system. The user account selection information includes at least one of directory services group membership information and access privilege information. Selecting the universal user account includes correlating a universal local user account access level to a corresponding group membership of the user. The mapping enables the user to access the computer system in accordance with an access privilege level corresponding to the universal local user account.

In accordance with another embodiment of the disclosed methods and systems, a computer-implemented method for enabling users to access a computer system comprises creating a plurality of universal local user accounts, determining a non-local status of a user (i.e., a non-local remote user) with respect to the computer system, determining group membership affiliations of the non-local remote user and associating the non-local remote user with a universal local user account (i.e., the corresponding universal local user account) after determining the non-local status. The corresponding universal local user account has access privilege on the computer system and associating the non-local remote user is performed dependent upon the group membership affiliations of the non-local remote user. Associating the non-local remote user further includes correlating a universal local user account access level to a corresponding access level of a group membership of the non-local remote user. The corresponding universal local user account is one of a plurality of universal local user accounts and each one of the universal local user accounts has a respective access privilege level associated therewith. Associating the non-local remote user still further includes selecting the corresponding universal local user account dependent upon user account selection information of the non-local remote user and mapping the non-local remote user to the corresponding universal local user account. Selecting the corresponding universal user account includes correlating a universal local user account access level to an access level of a group membership of the non-local remote user. The mapping enables the non-local remote user to access the computer system in accordance with an access privilege level corresponding to the universal local user account. The user account selection information includes at least one of directory services group membership information and access privilege information.

Figure 2:
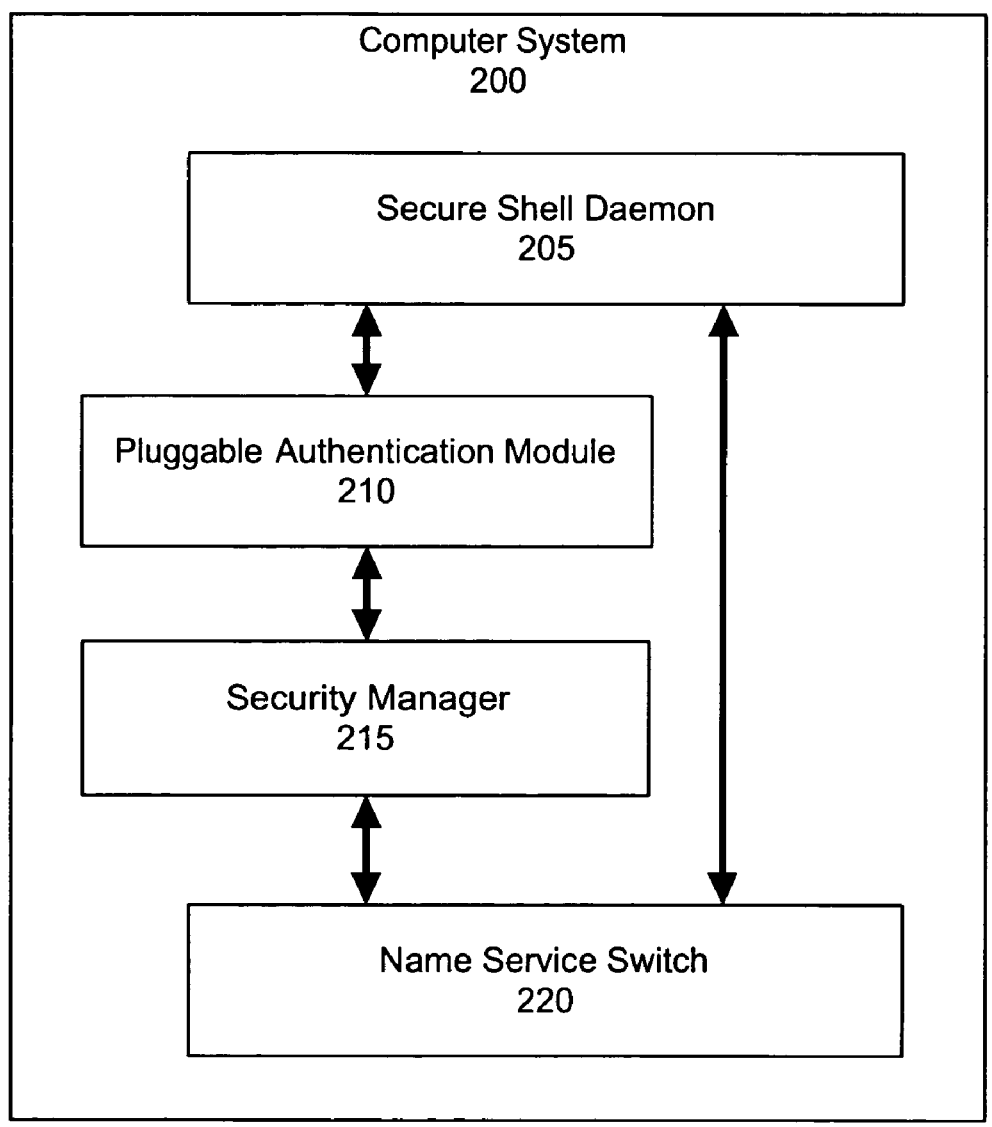
FIG. 2 depicts a system configured for carrying out remote computer system access in accordance with embodiments of the disclosures made herein.

Turning now to specific figures, FIG. 1 depicts a method 100 (i.e., an embodiment of a disclosed method) for facilitating remote access of the computer system 200 (i.e., an embodiment of a disclosed system) depicted in FIG. 2. It should be understood and is contemplated herein that the computer system 200 depicted in FIG. 2 is one embodiment of a disclosed system capable of carrying out the method 100. Accordingly, it should be understood and is contemplated herein that implementation of disclosed methods (e.g., the method 100) is not limited to being carried out via the computer system 200.

An operation 105 is performed for authenticating a remote user in response to the remote user attempting to remotely log-in to the computer system 200 via a Secure Shell Daemon (SSHD) 205 using one or more Pluggable Authentication Modules (PAM) 210. The remote user has an account on a shared directory service manager (on a networked computer system, not specifically shown) configured for use on the computers system 200. Microsoft Active Directory Server is an example of a shared directory service manager. An appropriate system or systems (e.g., a networked computer system, not specifically shown) facilitates such authentication based on information such as that obtained by prompting the remote user for a user identification (UID) and password. The method 100 terminates (e.g., ends or re-requests authentication information) in response unsuccessfully authenticating the remote user.

In response to the remote user being successfully authenticated, an operation 110 is performed for determining an account status of the remote user. In one embodiment, one or more Pluggable Authentication Modules 210 consults with a Security Manager (SM) 215 for determining the account status. The Security Manager 215 is a software component of the computer system 200 that enforces the authorization process used on the computer system 200. If it is determined that the remote user is a local remote user (i.e., has a local account), an operation 115 is performed for facilitating a local user access authorization process granting access to the computer system 200 with the identity of the remote user's local account.

If it is determined that the remote user is a non-local user (i.e., does not have a local account), an operation 120 is performed for determining group affiliations of the non-local remote user. To determine such group affiliations, the Security Manager 215 consults the shared directory service manager's database. In one embodiment, the Security Manager 215 consults the shared directory service manager's database through use of a Name Service Switch 220 of the computer system 200. If the Security Manager 215 does not determine any recognized group membership affiliations, the method 100 terminates (e.g., ends or requests additional affiliation information). If the Security Manager 215 identifies a recognized group membership affiliations (i.e., indicating that access should be granted), an operation 125 is performed by the Security Manager 215 for determining to the corresponding universal local user account (i.e., the corresponding local pre-created account) to which the non-local remote user should be mapped.

After determining the corresponding universal local user account, an operation 130 is performed for granting access under the corresponding universal local user account. Granting access includes propagating the decision to grant access to the non-local remote user and the corresponding universal local user account back to the PAM 210 from the security Manager 215 and the Name Service Switch 220 for authorization, and likewise back to the Secure Shell Daemon 205. Accordingly, the Secure Shell Daemon 205 grants the non-local remote user access with the identity and access level of corresponding to the universal local user account.

It is contemplated herein that any number of algorithms, methods and the like can be used to determine the universal local user account to which the non-local remote user is to be mapped. In one embodiment, the computer system 200 is configured with a group mapping that describes one-to-one relationships (i.e., one-to-one mapping) between remote directory service groups and local administrative groups (e.g., in a dual column table). The non-local remote user is mapped to a universal local user affiliated with local groups analogous to those of the non-local remote user.

Referring now to computer readable medium in accordance with embodiments of the disclosures made herein, methods, processes and/or operations as disclosed herein for enabling disclosed remote access functionality are tangibly embodied by computer readable medium having instructions thereon for carrying out such methods, processes and/or operations. In one specific example, instructions are provided for carrying out the various operations of the methods, processed and/or operations depicted in FIG. 1. and/or associated with the computer system depicted in FIG. 2. The instructions may be accessible by one or more processors (i.e., data processing devices) of a computer system as disclosed herein (i.e., a data processing system) from a memory apparatus (e.g. RAM, ROM, virtual memory, hard drive memory, etc), from an apparatus readable by a drive unit (e.g., a diskette, a compact disk, a tape cartridge, etc) or both. Examples of computer readable medium include a compact disk or a hard drive, which has imaged thereon a computer program adapted for carrying out disclosed remote access functionality.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical, chemical and electrical changes may be made without departing from the spirit or scope of the invention. For example, functional blocks shown in the figures could be further combined or divided in any manner without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A computer-implemented method for enabling users to remotely access a computer system using an active shared directory account maintained on a different computer system, comprising:

facilitating authentication of a user using only information derived from said shared directory account, wherein said authenticating includes the computer system accessing said shared directory account on the different computer system;

determining that the user does not have a local account on the computer system in response to successfully authenticating the user thereby recognizing that the user is a non-local user with respect to the computer system;

selecting a universal local user account of the computer system in response to successfully identifying a recognized group membership affiliation for the user that corresponds to said shared directory account such that the universal local user account is selected dependent upon said shared directory account and the recognized group membership affiliation, wherein the universal local user account has access privilege on the computer system; and mapping the user to the universal local user account, wherein said mapping enables access to the computer system by the user in accordance with an access privilege level corresponding to the universal local user account.

2. The method of claim 1 wherein selecting the universal local user account of the computer system dependent upon said shared directory account includes determining at least one of directory services group membership information associated with said shared directory account and access privilege information associated with said shared directory account.

3. The method of claim 1 wherein said selecting the universal user account includes correlating a universal local user account access level to a corresponding group membership of the user.

4. The method of claim 1 wherein:
    the universal local user account is one of a plurality of universal local user accounts; and
    each one of said universal local user accounts has a respective access privilege level associated therewith.

5. The method of claim 1, further comprising:
    creating said plurality of universal local user accounts prior to performing said selecting,
    wherein each one of said universal local user access accounts has a respective access privilege level associated therewith.

6. The method of claim 1 wherein several users can be simultaneously mapped to the universal local user account for enabling simultaneous access by each one of said users to the computer system.

7. A computer-implemented method for enabling users to remotely access a computer system using an active shared directory account maintained on a different computer system, comprising:

facilitating authentication of a user using only information derived from said shared directory account, wherein said authenticating includes the computer system accessing said shared directory account on the different computer system;

determining that the user does not have a local account on the computer system thereby recognizing that the user is a non-local status user with respect to the computer system; and associating the user with a universal local user account of the computer system after said determining and in response to successfully identifying a recognized group membership affiliation for the user that corresponds to said shared directory account such that the universal local user account is selected dependent upon said shared directory account and the recognized group membership affiliation, wherein the universal local user account has access privilege on the computer system and wherein said associating enables access to the computer system in accordance with said access privilege corresponding to the universal local user account.

8. The method of claim 7 wherein associating the user with the universal local user account includes determining at least one of directory services group membership information associated with said shared directory account and access privilege information associated with said shared directory account.

9. The method of claim 7 wherein said associating includes correlating a universal local user account access level to a corresponding access level of a group membership of the user.

10. The method of claim 7 wherein:
    the universal local user account is one of a plurality of universal local user accounts; and
    each one of said universal local user accounts has a respective access privilege level associated therewith.

11. The method of claim 7, further comprising:
    creating said plurality of universal local user accounts prior to performing said selecting, wherein each one of said universal local user access accounts has a respective access privilege level associated therewith.

12. The method of claim 11 wherein said user account selection information includes at least one of directory services group membership information and access privilege information.

13. The method of claim 12 wherein said selecting the universal user account includes correlating a universal local user account access level to an access level of a group membership of the user.

14. The method of claim 7 wherein several users can be simultaneously mapped to the universal local user account for enabling simultaneous access by each one of said users to the computer system.

15. A computer system, comprising:
   at least one data processing device;
   instructions processable by said at least one data processing device; and
   an apparatus from which said instructions are accessible by said at least one data processing device; and
   means for accessing an active shared directory account maintained on a different computer system;
   wherein said instructions are configured for enabling said at least one data processing device to facilitate:
      facilitating authentication of a user using only information derived from the active directory account, wherein said authenticating includes the computer system accessing said shared directory account on the different computer system;
      determining that the user does not have a local account on the computer system in response to successfully authenticating the user thereby recognizing that the user is a non-local user with respect to the first computer system;
      selecting a universal local user account of the computer system in response to successfully identifying a recognized group membership affiliation for the user that corresponds to said shared directory account such that the universal local user account is selected dependent upon said shared directory account and the recognized group membership affiliation, wherein the universal local user account has access privilege on the computer system; and
      mapping the user to the universal local user account, wherein said mapping enables access to the computer system by the user in accordance with an access privilege level corresponding to the universal local user account.

16. The computer system of claim 15 wherein selecting the universal local user account of the computer system dependent upon said shared directory account includes determining at least one of directory services group membership information associated with said shared directory account and access privilege information associated with said shared directory account.

17. The computer system of claim 15 wherein said selecting the universal user account includes correlating a universal local user account access level to a corresponding group membership of the user.

18. The computer system of claim 15 wherein:
   the universal local user account is one of a plurality of universal local user accounts; and
   each one of said universal local user accounts has a respective access privilege level associated therewith.

19. The computer system of claim 15 wherein said instructions are further configured for enabling said at least one data processing device to facilitate:
   creating said plurality of universal local user accounts prior to performing said selecting,
   wherein each one of said universal local user access accounts has a respective access privilege level associated therewith.

20. The computer system of claim 15 wherein several users can be simultaneously mapped to the universal local user account for enabling simultaneous access by each one of said users to the computer system.

21. A computer system, comprising:
   at least one data processing device;
   instructions processable by said at least one data processing device; and
   an apparatus from which said instructions are accessible by said at least one data processing device; and
   means for accessing an active shared directory account maintained on a different computer system;
   wherein said instructions are configured for enabling said at least one data processing device to facilitate:
      facilitating authentication of a user using only information derived from the active shared directory account, wherein said authenticating includes the first computer system accessing said shared directory account on a different computer system;
      determining that the user does not have a local account on the computer system thereby recognizing that the user is a non-local status user with respect to the computer system; and
      associating the user with a universal local user account of the computer system after said determining and in response to successfully identifying a recognized group membership affiliation for the user that corresponds to said shared directory account such that the universal local user account is selected dependent upon said shared directory account and the recognized group membership affiliation, wherein the universal local user account has access privilege on the computer system and wherein said associating enables access to the computer system in accordance with said access privilege corresponding to the universal local user account.

22. The computer system of claim 21 wherein associating the user with the universal local user account includes determining at least one of directory services group membership information associated with said shared directory account and access privilege information associated with said shared directory account.

23. The computer system of claim 21 wherein said associating includes correlating a universal local user account access level to a corresponding access level of a group membership of the user.

24. The computer system of claim 21 wherein:
   the universal local user account is one of a plurality of universal local user accounts; and
   each one of said universal local user accounts has a respective access privilege level associated therewith.

25. The computer system of claim 21 wherein said instructions are further configured for enabling said at least one data processing device to facilitate:
   creating said plurality of universal local user accounts prior to performing said selecting, wherein each one of said universal local user access accounts has a respective access privilege level associated therewith.

26. The computer system of claim 25 wherein said user account selection information includes at least one of directory services group membership information and access privilege information.

27. The computer system of claim 25 wherein said selecting the universal user account includes correlating a universal local user account access level to an access level of a group membership of the user.

28. The computer system of claim 21 wherein several users can be simultaneously mapped to the universal local user account for enabling simultaneous access by each one of said users to the computer system.

* * * * *